L. R. EVANS.
MOTOR CYCLE.
APPLICATION FILED APR. 17, 1915.

1,182,542.

Patented May 9, 1916.
2 SHEETS—SHEET 1.

L. R. EVANS.
MOTOR CYCLE.
APPLICATION FILED APR. 17, 1915.

1,182,542.

Patented May 9, 1916.
2 SHEETS—SHEET 2.

WITNESSES:
H. L. Trimble
E. Heron

INVENTOR:
Leigh R. Evans,
by H. J. S. Dennison
atty

UNITED STATES PATENT OFFICE.

LEIGH R. EVANS, OF TORONTO, ONTARIO, CANADA, ASSIGNOR, BY MESNE ASSIGNMENTS, TO CYCLEMOTOR CORPORATION, OF ROCHESTER, NEW YORK, A CORPORATION OF NEW YORK.

MOTOR-CYCLE.

1,182,542.     Specification of Letters Patent.     Patented May 9, 1916.

Application filed April 17, 1915. Serial No. 22,212.

*To all whom it may concern:*

Be it known that I, LEIGH R. EVANS, a citizen of the United States of America, and resident of the city of Toronto, county of York, Province of Ontario, in the Dominion of Canada, have invented certain new and useful Improvements in Motor-Cycles, described in the following specification and illustrated in the accompanying drawings, that form part of the same.

The principal objects of the invention are, to increase the efficiency of the ordinary bicycle by the application of power thereto and to provide a simple, compact and efficient power plant which may be readily installed on an ordinary bicycle at moderate cost and which will not require any alteration to the same, and which is extremely light and easily handled.

The principal feature of the invention consists in the novel construction and arrangement of parts whereby the engine, magneto and muffler form a rigid unit which may be placed between the front reach and upright of the diamond frame of the bicycle and will not interfere with the ordinary pedal and sprocket drive, and whereby the belt pulley and magneto drive wheels are arranged in the same plane with a gear on the engine shaft and are driven directly therefrom.

Figure 1:
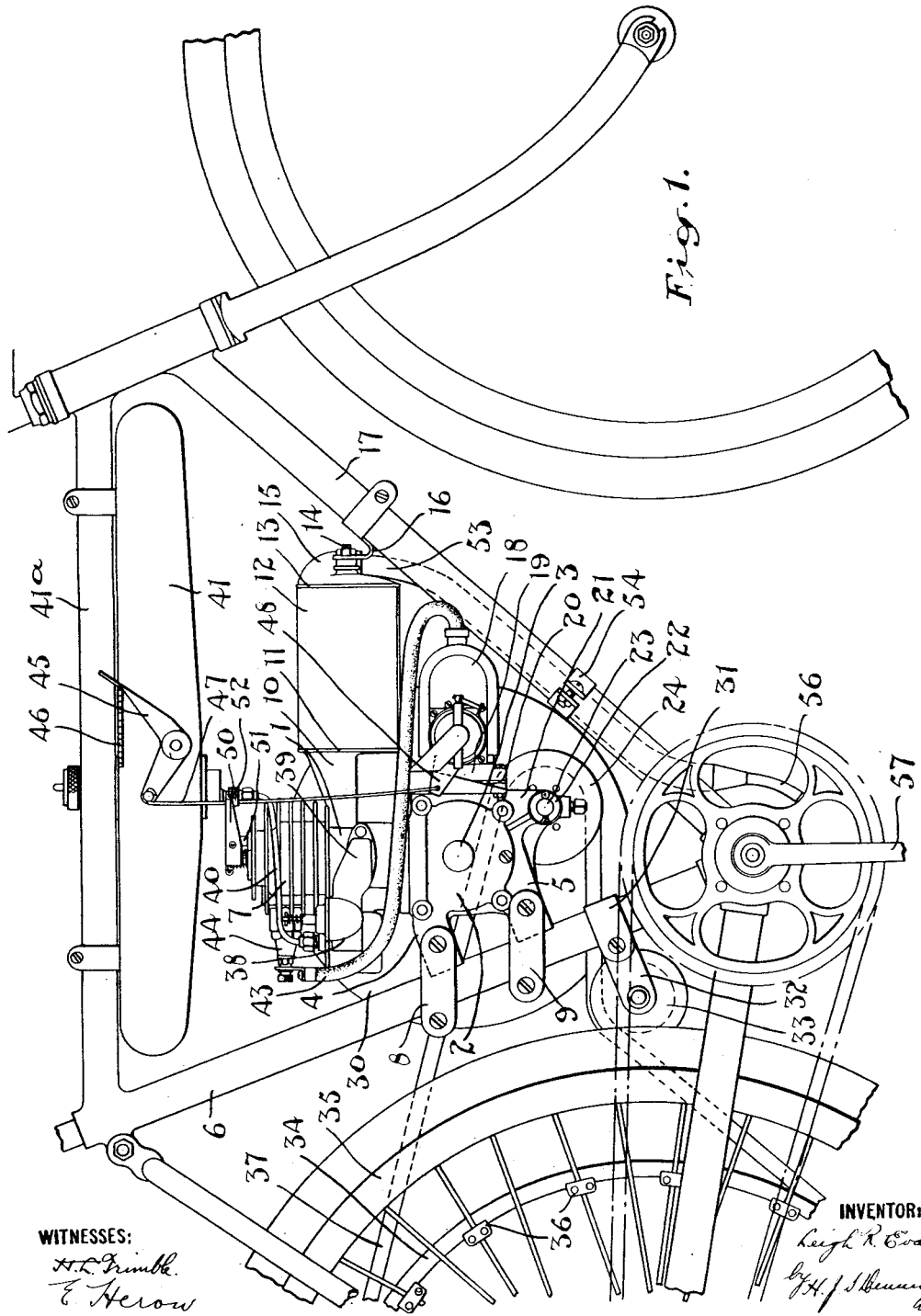
Figure 2:
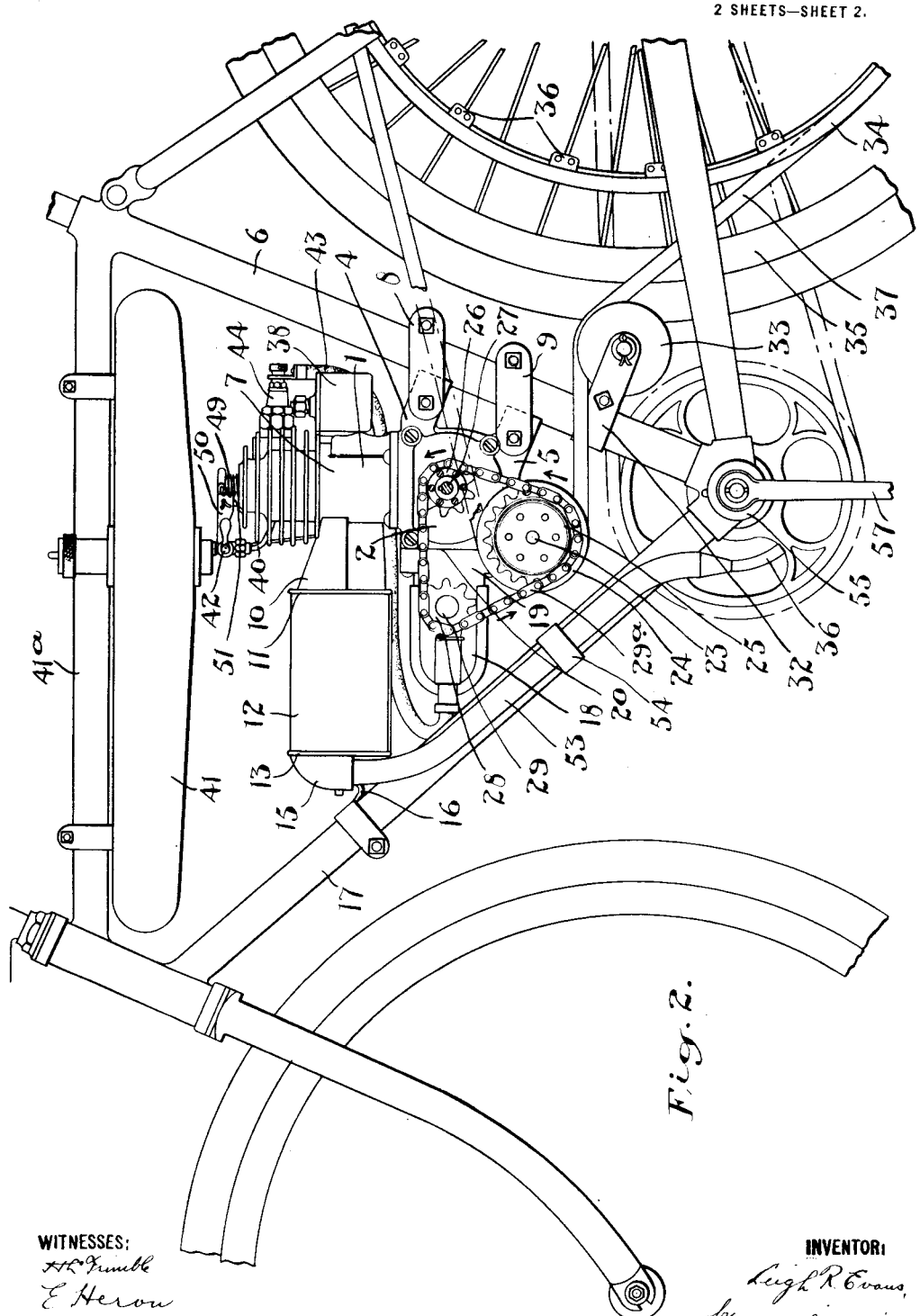

In the drawings, Figure 1 is a side elevational view of the invention showing the general construction and arrangement of the parts and the manner of connecting same to the frame of a bicycle. Fig. 2 is a side elevational view taken from the opposite side to Fig. 1, the flywheel being removed and showing the drive gear for the belt pulley and magneto.

Like numerals of reference indicate corresponding parts in each figure.

Referring to the drawings, 1 is the engine which is of the two cycle air cooled type having the crank case 2 formed substantially cylindrical and provided with a central projection 3 forming a bearing for the crank shaft, said bearing being closed at the outer end.

4 and 5 are lugs formed integral with the crank case and extending angularly downward from one side thereof and adapted to fit against the upright tube 6 of the bicycle frame preferably maintaining the engine cylinder 7 in a vertical position.

8 and 9 are clips secured to the lugs 4 and 5 and embracing the upright 6 being preferably set at an obtuse angle to the tube to distribute vibration over as large an area of the tube as possible to avoid crystallization.

10 is a hollow member formed integral with the engine cylinder and extending forwardly therefrom and forming the exhaust passage from the cylinder and having a circular shaped outer end 11 forming one end of the muffler 12.

The cap 13 at the forward end of the muffler is secured by a bolt 14 which is secured at the inner end in the member 11 and is provided with an outlet 15 arranged at one side of the center.

16 is a clip secured to the bolt 14 and embracing the lower reach 17 of the bicycle thus forming a rigid support for the forward side of the engine which will steady it and prevent any lateral movement.

18 is the magneto arranged in a substantially horizontal position having its base 19 rigidly secured to the facing 20 on the forward side of the crank case 2.

21 is a lug formed integral with the crank case and extending downwardly from the underside thereof and having a horizontal bearing 22 in which the spindle 23 of the grooved drive pulley 24 is journaled.

25 is a sprocket wheel secured to the outer side of the pulley 24.

26 is a sprocket wheel secured to the extending end of the engine crank shaft 27 arranged in alinement with the sprocket 25.

28 is a sprocket wheel secured to the magneto shaft 29 arranged in the same vertical plane with the sprockets 25 and 26.

29ª is an endless sprocket chain extending around the sprockets 25, 26 and 28, the drive being in the direction indicated by arrows, the pull being from the engine sprocket to the drive pulley sprocket, the slack chain passing around the magneto sprocket. A chain drive is herein shown and described but intermeshing spur gears might be used if desired, arranged in a common vertical plane. This arrangement of drive is very simple and effective and eliminates the use of counter shafts.

30 is a flywheel preferably formed of steel plate bolted or riveted securely to the outer side of the sprocket wheel 26 and forming an effective guard to the drive gear.

31 is a clip embracing the upright tube 6 below the clips 8 and 9 and supporting a bracket 32 carrying a grooved idler pulley 33 arranged in alinement with the pulley 24.

34 is a grooved ring secured to the spokes of the rear wheel 35 of the bicycle by means of suitable clips 36 and arranged in alinement with the pulleys 33 and 24.

37 is the drive belt extending around the ring 34 and pulley 24 and over the idler 33 which is adjustable on the tube 6 to secure the proper tension.

38 is the carbureter arranged preferably to the rear of the engine cylinder and connected by the duct 39 to the intake port of the engine which is here shown arranged at one side. The carbureter is connected by a tube 40 to the gasolene tank 41 carried on the upper reach 41ª of the bicycle frame and is provided with a suitable valve cock 42.

43 is the electric cable connecting the magneto with the spark plug 44 arranged in the side of the head of the cylinder.

45 is a bell crank lever pivotally supported on the side of the gasolene tank and held in adjusted positions by the ratchet plate 46.

47 is a rod connected to the lever 45 and to the control lever 48 of the magneto.

49 is a relief valve arranged in the head of the cylinder spring held to its closed position.

50 is a lever pivotally supported intermediate of its length on a lug 51 arranged on the top of the cylinder, said lever having one end extending over the stem of the relief valve and the other end encircling the rod 47.

52 is a stop arranged on the rod 47 adapted to engage the lever 50 when the lever 45 is moved to its extreme forward position and the magneto is cut out and to tilt the lever 50 to push inwardly on the stem of the relief valve and thus open the same, preventing compression and stopping the operation of the engine.

53 is a pipe connected to the outlet from the muffler and curved downwardly and arranged alongside of the lower reach of the bicycle being held in place by a clip 54. The discharge end of the tube is curved downwardly in front of the crank hanger 55 of the bicycle and provided with a flattened and flaring discharge end 56.

The bicycle is provided with the ordinary sprocket and chain drive and the construction and arrangement of the engine and its coacting parts is such that no part thereof will extend into the path of the pedal cranks 57 nor do they interfere in any way with the limbs of the rider in propelling the machine.

In operating the machine the rider mounts in the usual manner and propels the machine by means of the pedals, the relief valve being open. When he has attained sufficient speed the lever 45 is operated to close the relief valve and cut in the magneto and the engine at once starts into operation driving the bicycle by means of the belt. The carbureter is of an ordinary type of float feed and the speed control is effected by the advance or retarding of the spark.

The construction of the power unit is simple, compact and very rigid and is designed solely for application to the ordinary bicycle. The simple compact form and extreme lightness is such as not to in any way impair or interfere with the use of the bicycle in the event of the engine getting out of order.

What I claim as my invention is:—

1. In a motor cycle, the combination with the cycle frame and drive wheel, of a driving unit comprising an engine adapted to be rigidly secured in the frame and having a driving wheel on one end of its crank shaft, a drive pulley carried in a journal on the engine frame adjacent to the drive wheel on the engine shaft and operatively connected to the cycle, drive wheel, a magneto rigidly secured to the engine, and means operatively connecting the drive wheel on the engine shaft with said drive pulley and the shaft of said magneto, said means operating in a single vertical plane.

2. In a motor cycle, an engine and a magneto rigidly connected thereto and a muffler rigidly secured to the engine cylinder and forming a rigid unitary power structure adapted to be secured in the cycle frame, a drive pulley journaled in a bearing in the engine frame and operatively connected to the cycle drive wheel, and means operatively connecting the engine shaft, magneto and drive pulley.

3. In a motor cycle, an engine having one end of its crank shaft extending beyond one side of the casing, a magneto rigidly connected to said engine and having its shaft arranged parallel to the engine shaft, a drive pulley mounted on a shaft arranged parallel with the engine and magneto shafts and adjacent thereto in triangular arrangement, sprocket wheels arranged upon said engine shaft, magneto shaft and drive pulley in a common vertical plane, an endless chain extending around said triangularly arranged sprocket wheels, the pull upon the drive pulley being direct from the engine, the magneto being driven indirectly on the loose side of the chain, and means operatively connecting the drive pulley with the rear wheel of the cycle.

4. In a motor cycle, the combination with the cycle frame, of an engine rigidly secured to said frame having the crank shaft bearing on one side inclosed and the crank shaft projecting from the case on the other side and carrying a drive wheel, a magneto rigidly secured to said engine frame having it shaft arranged parallel with the engine shaft and carrying a drive wheel arranged in the same plane as the drive wheel of the engine shaft, a driving pulley journaled in a bearing arranged parallel with the engine shaft and carrying a drive wheel, means operatively connecting the drive wheels of the engine shaft, drive pulley and magneto, and a disk fly wheel mounted on the outer end of the engine shaft and forming a guard covering the driving connections between the crank shaft, drive pulley and magneto.

5. In a motor cycle, the combination with the cycle frame, of a power unit comprising an engine, magneto and muffler rigidly connected in a unitary structure and adapted to be secured within the cycle frame clear of the pedals and cranks, said engine having its crank shaft extending from one side of the crank case, a drive pulley journaled below said crank shaft, means operated from the crank shaft for operating said pulley and magneto, a grooved ring secured to the spokes of the cycle rear wheel, a belt extending around said ring and pulley, and an idler pulley adjustably arranged on the upright tube of the cycle frame adapted to engage the underside of the belt.

6. In a motor cycle, the combination with the cycle frame, of an engine having a crank case formed with projecting lugs to engage the upright tube of the cycle and hold the engine in a vertical position, clips secured to said lugs and extending obliquely around said upright tube, a muffler rigidly secured to the engine cylinder, means for rigidly securing said muffler to the lower reach of the cycle frame, a magneto, and means for operatively connecting the rear wheel of the cycle with the engine.

7. In a motor cycle, the combination with the cycle frame, of an engine, a magneto and muffler rigidly connected in a unitary structure and adapted to be secured within the cycle frame clear of the pedals and cranks, a rod operatively connected to the magneto control, a lever adapted to operate said rod, a relief valve adapted to open the head of the engine cylinder, and means operatively connected with said rod adapted to open said relief valve.

8. In a motor cycle, the combination with the cycle frame, of a power unit comprising an engine, magneto and muffler rigidly connected in a unitary structure and adapted to be secured within the cycle frame clear of the pedals and cranks, a rod operatively connected to the magneto control, a lever adapted to operate said rod, a relief valve adapted to open the head of the engine cylinder, a lever pivoted intermediate of its length on the engine cylinder and adapted to engage and open the relief valve, and a stop arranged on said rod adapted to engage and operate the relief valve operating lever.

9. In a motor cycle, an engine frame, a magneto rigidly secured to the crank case of the engine, a carbureter secured directly to the outer wall of the cylinder adjacent to the crank case, a muffler rigidly secured to the engine cylinder at the exhaust side, a drive shaft journaled in a bearing in the engine frame all forming a rigid unitary structure adapted to be supported in the frame of the cycle, means for operating said drive pulley and magneto from the crank shaft, and means connecting the drive wheel with the rear wheel of the cycle.

Signed at the city of Toronto, county of York, Ontario, Canada, this 9th day of April, 1915.

LEIGH R. EVANS.

Witnesses:
E. HERON,
H. L. TRIMBLE.